Jan. 30, 1968 J. C. PRICE 3,366,948

REFERENCE LEVEL ZERO ADJUSTER FOR ANALOG TO DIGITAL CONVERTER

Filed July 9, 1964

United States Patent Office 3,366,948

Patented Jan. 30, 1968

3,366,948
REFERENCE LEVEL ZERO ADJUSTER FOR ANALOG TO DIGITAL CONVERTER

John Clifford Price, Tye Green, Harlow, Essex, England, assignor to International Standard Electric Corporation, New York, N.Y., a corporation of Delaware Filed July 9, 1964, Ser. No. 381,413
Claims priority, application Great Britain, July 19, 1963, 28,626/63, 28,627/63
9 Claims. (Cl. 340—347)

ABSTRACT OF THE DISCLOSURE

A gate circuit periodically zeros itself by adjusting the potential used as a base line for PCM encoding. This is done by causing a periodical adjustment in the charge on a capacitor.

This invention relates to analog to digital converters and more particularly to converters for making zero adjustments in the reference lend used in pulse code modulating (PCM) telephone systems.

Analog to digital converters are, of course, well known. The analog signal varies according to a natural phenomenon to provide a smooth flowing signal having a curve which is analogous to the quantity producing the phenomena. In telephony, the curve matches the undulations of the human voice. The digital converter provides a series of output pulses which indicate the state of the curve at any given instant. Thus, if the curve is ten units above a base line, ten output pulses may be produced. Obviously, the consistency of the base line becomes crucial.

Heretofore, the base line has very often been established by the residual charge remaining after a capacitor has been discharged. But what happens if the capacitor does not always discharge to the same level? Or what happens if, after the discharge, the capacitor partially recharges? In the past, the ambiguity of the base line caused by an uncertain level of discharge has caused problems.

Known converters also suffer from inbalance conditions. More specifically, the converter has two inputs. One has a reference signal and the other has the analog signal applied thereto. As long as the difference between the two inputs is a function of the analog signal, there is no problem. However, if the two inputs begin to drift with respect to each other an error is introduced.

Accordingly, an object of the invention is to provide new and improved analog to digital converters. More particularly, an object is to provide drift free converters. In this connection, an object is to provide a means for reliably setting the base line from which an analog signal is measured.

According to one of its aspects, the invention provides for a discharging of an elecrical energy storage device to a substantially constant residual energy level. Preferably, an electronic switching device isused to cause the discharge. However, the energy storage device is sometimes charged through the discharge path which is controlled by and includes the electronic switch. The switch itself has a residual energy level which is determined by the energy level of the storage device before it is discharged. To prevent an unfavorable effect from the residual energy in the switch at least two of the switching devices are provided. The storage device begins to discharge through one of said switching devices and completes the discharge through the other of the switching devices. This brings the switch to the constant residual level.

According to another aspect of the invention, an electrical comparator arrangement is provided with first and second input terminals. An output signal is produced which is indicative of the difference in electric potential between these input terminals. Periodically, the output signal is used for substantially eliminating said difference in potential between the input terminals.

The above mentioned and other features of this invention and the manner of obtaining them with become more apparent, and the invention itself will be best understood by reference to the following description of an embodiment of the invention taken in conjunction with the accompanying drawings, in which.

Figures 1, 2, 3, 4:
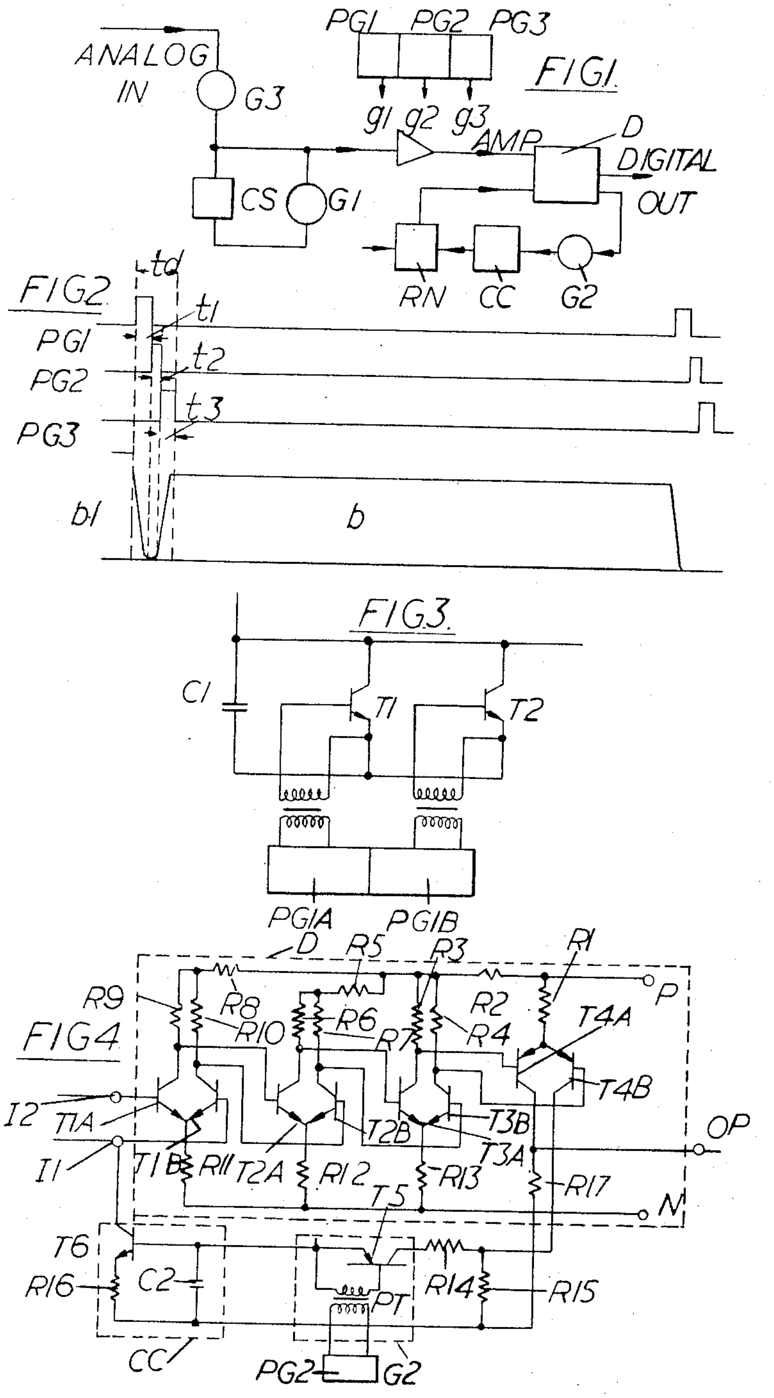
FIG. 1 is a logic schematic diagram of an analog to digital signal conversion system.
FIG. 2 is a timing chart which shows the sequence of operation of the system of FIG. 1.
FIG. 3 is a circuit diagram of that part of FIG. 1 which is shown by blocks G1 and CS.
FIG. 4 is a circuit diagram of that part of FIG. 1 which is shown by blocks D, CC, G2.

FIG. 1 shows a circuit for converting an analog signal at the "In" terminal into a digital signal at the "Out" terminal. Each successive input analog signal represents the instantaneous amplitude level of a voice signal in one channel of a time division multiplex PCM telephone system. Each analog signal is passed via a gate G3 into an energy storage device (capacitor store) CS which is charged to the level of the respective analog signal. The gate G3 is operated under control of a pulse generator PG3.

The analog signal on the store CS is passed via a preamplifier AMP to a first input of a discriminator D. A second input of discriminator D is energized at a steady reference level (called a "weighting current"). The discriminator produces a digital output in any known manner responsive to the difference between the potentials applied to the two inputs, namely the analog signal and the sum of weighting currents presented through a resistance network RN by logic circuits (not shown).

After the discriminator delivers the digital output, a gate G2 is operated under control of a pulse generator PG2. Then, a compensation circuit CC operates to counteract any drift or level change in the pre-amplifier AMP and any shift in the discriminator D. FIG. 2 shows the timing of the various operations. The chain of pulse generators PG1, PG2 and PG3 is triggered for each channel in the multiplex. Generator PG1 operates gate GI to discharge the capacitor store CS from the voice storage level of channel $b-1$ during a period of time $t1$ (for example, 240 nanoseconds). Generator PG2 operates gate G2 for a time $t2$ (for example, 100 nanoseconds), during which time the compensation circuit CC moves to correct any drift in either the pre-amplifier AMP or the discriminator D. Generator PG3 operates gate G3 for a time $t3$ (for example, 240 nanoseconds), to change the store to the level of channel $b$.

The necessary discharging, zeroing and recharging operations are carried out within the digit period $td$ used for signaling, so that it is possible to code without the complication of retiming or alternative use of two coders.

The circuit diagram of the capacitor store CS and the gate G1 is shown in FIG. 3.

The store comprises a capacitor C1 which is provided with two possible discharge paths. One discharge path includes the collector-emitter path of a transistor T1. The other discharge path includes the collector-emitter path of a transistor T2.

Transistor T1 is turned on and off under control of pulse generator PG1A which supplies turn-on pulses through a path including the base-emitter path of transistor T1. Transistor T2 is turned on and off under control of pulse generator PG1B which supplies turn-on pulses through a path including the base-emitter path of transistor T2.

The instantaneous level of the particular channel being sampled determines the energy level to which the capacitor C1 is charged. This level may be anywhere within the range of levels of the system. It follows, therefore, that the capacitor C1 has to be discharged from any level to which it is charged. To ensure proper operation of the system, the capacitor C1 must always be discharged to the same residual energy level. Moreover, this residual level must be sufficiently low to prevent cross-talk between channels.

If a single transistor is used for the discharge gate, the drive must not be too much greater than necessary to discharge the maximum voltage. Otherwise, the capacitor store CS may be discharged to a level which is only slightly lower than the level of a small signal. This is because transistors have a residual energy level determined by the energy level that they are required to discharge. Thus, if a single transistor is used to discharge capacitor C1, the exact level to which it is discharged is influenced by whether the transistor initially does or does not have to conduct in saturation. The internal temperature and the charge distribution may be sufficiently different to give small differences in the final level. This, in turn, may cause a variation in the digital output.

The invention uses two transistors T1 and T2 to ensure that the capacitor C1 is discharged to a substantially constant residual energy level.

The main discharge path is via transistor T1 as controlled by pulse generator PG1A. Transistor T1 is switched off as soon as the discharge is down to a low level, for example when discharge is from a maximum of 4 volts to the region of millivolts. Then transistor T2 is switched on to complete the discharge to the substantially constant residual energy level. This way, the transistor T2 is never called on to discharge heavily so it discharges to a very uniform level. In a test such a circuit showed at least a three-fold improvement over the single transistor gate mentioned above.

Providing that the discharge commences solely through transistor T1 and is completed solely through transistor T2, it is unimportant whether in the interim period, transistor T1 is switched off as or just before transistor T2 is switched on. The switching on of transistor T2 may overlap with switching off transistor T1.

To further minimize any possibility of cross-talk, a third transistor may be used to provide a third parallel discharge path for the capacitor store. The three transistors are then switched successively just as the transistors T1, T2 are switched successively.

The discriminator circuit D shown in FIG. 4 can make a decision with ⅓ quantum (10 mv.) unbalance in 85 nanoseconds. To do this, the discriminator D is required to discriminate between the potentials applied to its two inputs. The analog signal on the store CS is applied to the upper input of discriminator D. The sum of the weights presented by the logic circuits is applied to the lower input. The discriminator has to be sensitive to a fraction of a quantum. It has to have a rapid response even to small voltage differences and has to operate over the whole signal range without either overloading or blocking. It has to be stable and free from drift. This combination of stringent requirements arises from all the discrimination for coding being done by one discriminator.

The circut comprises an input stage including a pair of n-p-n transistors T1A, T1B, two intermediate stages including a pair of n-p-n transistors T2A, T2B and T3A, T3B, (respectively) and an output stage including a pair of p-n-p transistors T4A, T4B.

Positive power supply terminal P is connected via a resistance R1 to the common emitters of transistors T4A and T4B, and via a resistance R2 through individual resistances R3, R4 to the collectors of transistors T3A and T3B respectively, through a resistance R5 and individual resistances R6, R7 to the collectors of transistors T2A and T2B respectively, and through a resistance R8 and individual resistances R9, R10 to the collectors of transistors T1A and T1B respectively.

Negative power supply terminal N is connected via a resistance R11 to the common emitters of transistors T1A and T1B, via a reistance R12 to the common emitters of transistors T2A and T2B, via a resistance R13 to the common emitters of transistors T3A and T3B. Output terminal OP is connected to the collector of transistor T4A.

The collectors of transistors T1A, T2A and T3A are connected respectively to the bases of transistors T2A, T3A and T4A. The collectors of transistors T1B, T2B and T3B are connected respectively to the bases of transistors T2B, T3B and T4B.

The collector of transistor T4B is connected via a resistance R14 to the collector of a transistor T5 and via a resistance R15 to earth. The emitter of transistor T5 is connected to the base of a transistor T6. The emitter of transistor T6 is connected via a resistance R16 to earth. The collector of transistor T4A is connected via a resistance R17 and the resistance R16 to the emitter of transistor T6.

Pulse generator PG2 is connected via a pulse transformer PT between the base and emitter of transistor T5. A capacitor C2 is connected between the base of transistor T6 and the side of resistance R16 remote from the emitter of T6. The collector of transistor T6 is connected to the load common to the source of weighting currents which forms one of the inputs I1 to the discriminator connected to the base of transistor T1B. The other input, I2, connects the capacitor store CS of FIG. 1 to the base of transistor T1A.

When the discriminator is operating to deliver a digital output corresponding to the analog input, the level to which the capacitor store CS (FIG. 1) is charged is present on the input I2 to the discriminator. According to the form of digital output required (i.e. whether plain binary or other forms) the other input is presented with successive potentials as determined by the logic circuits. For example, a mark or binary one output is delivered if a plain binary output is required and if a particular potential applied from the logic circuit is below the potential on the other input. If the applied potential is above the store level, a space or binary nought (no output in this case) is delivered.

Since each stage of the discriminator comprises two transistors connected in the long tail pair of configuration as shown in FIG. 4 and since the stages are interconnected in cascade, the input transistor of the input pair (T1A, T1B) having the higher potential on its base will conduct. This conductive state will be passed through the stages of the discriminator. Thus, transistor T1A conducts if the potential (input I2) stored at CS is higher than the potential (input I1) presented by the weighting current. Then, the transistor T4A conducts at the output stage and a mark output appears at OP. Transistor T1B conducts if the stored potential at input I1 is lower than the potential presented in input I1 by the weighting current. No output appears at OP, but this corresponds to a space output.

After the discriminator has delivered either a mark or a space digital output corresponding to the particular sampling of the analog signal, for example at the level of channel $b-1$ (FIG. 2), the system is prepared for channel $b$. The store CS is discharged during itme $t1$, and the weighting currents are removed from the input I1 to the discriminator D.

The period $t2$ is allocated in the time cycle so that the discriminator can zero itself. More particularly, during time $t2$, the potentials on the two inputs to the discriminator should be equal. The pulse generator PG2 renders transistor T5 conducting for time $t2$. If the potential level on the weighting current input I1 exceeds that on the capacitor store input I2, transistor T4B conducts and capacitor C2 charges. The current increases in transistor T6 and reduce the potential on the capacitor store input I2 until the two discriminator inputs are balanced.

In the arrangement shown in FIG. 4, the capacitor C2 is continuously discharging through the base-emitter path of transistor T5. An additional high value of resistance may be inserted in parallel with capacitor C2 to ensure the continuous discharge of capacitor C2.

The rate of discharge of capacitor C2 is normally controlled by transistor T6 to be at a rate which is slow compared with the zeroing period $t2$. Normally, therefore, the potential on the capacitor store input I2 tends to fall below that on the weighting current input I1. However, due to the controlled slow rate of discharge of capacitor C2, the potentials at inputs I1, I2 are equalized during the periods $t2$ before such a fall can effectively occur.

While the principles of the invention have been described above in connection with specific apparatus and applications, it is to be understood that this description is made only by way of example and not as a limitation on the scope of the invention.

I claim:

1. An electrical comparator arrangement including an input connected to a voltage source of a fixed reference potential level relative to which various signal amplitudes are measured, said potential level being subject to drifting with time, a first input terminal and a second input terminal, said source of reference potential being coupled to said first terminal, means for applying a fixed potential to the second terminal, first means responsive to a difference in electric potential between said input terminals for delivering an outpot signal indicative of the sense of said difference, and second means for periodically utilizing said output signal for substantially eliminating said difference in potential between said input terminals.

2. An arrangement as claimed in claim 1 in which said second means comprises gating means for controlling the periodic utilization of said output signal, a variable impedance device connected to one of said input terminals, and means for varying the impedance of said device when said gate is open according to the sense of a said output signal and in such a manner as to bring the potential on said one input terminal to substantially equal the potential on the other of said input terminals.

3. An arrangement as claimed in claim 2 in which said gating means comprises a transistor.

4. An arrangement as claimed in claim 2 in which said variable impedance device comprises a transistor.

5. An arrangement as claimed in claim 1 in which said first means includes at least one pair of transistors connected in a long tail pair configuration.

6. An arrangement for discharging an electrical energy storage device from any energy level to a substantially constant residual energy level comprising a discharge path controlled by and including an electrical switching means having a residual energy level determined by the energy level from which said storage device is discharged therethrough, said switching means comprising at least two electronic switching devices connected in parallel, means for causing said storage device to commence discharging solely through one of said electronic switching devices, and means for causing said storage device to complete said discharging solely through the other of said electronic switching devices until said constant residual level is reached.

7. An electrical switching arrangement including an electrical energy storage device, means for discharging said storage device from any energy level to a substantially constant residual energy level comprising a first discharge path means controlled by and including a first electrical switching device, a second discharge path means controlled by and including a second electrical switching device, said first and second switching devices each having a residual energy level determined by the energy level from which said storage device is discharged therethrough, and means for controlling said switching devices that said storage device begins discharging solely through said first discharge path and finishes discharging to said constant residual level solely through said second discharge path.

8. An electrical switching arrangement as claimed in claim 7 in which each said switching device comprises a transistor.

9. An electrical switching arrangement as claimed in claim 7 and an analog to digital signal conversion system including an electrical switching arrangement comprising an electrical comparator arrangement including a first input terminal and a second input terminal, first means responsive to a difference in electric potential between said input terminals for delivering an output signal indicative of the sense of said difference, and second means for periodically utilizing said output signal for substantially eliminating said difference in potential between said input terminals.

References Cited

UNITED STATES PATENTS

| | | | |
|---|---|---|---|
| 2,845,597 | 7/1958 | Perkins ____________ | 324—103 |
| 3,123,679 | 3/1964 | Donville __________ | 179—175.2 |

MAYNARD R. WILBUR, *Primary Examiner.*

J. WALLACE, *Examiner.*